US009930867B2

(12) United States Patent
Lipscomb

(10) Patent No.: US 9,930,867 B2
(45) Date of Patent: Apr. 3, 2018

(54) PET FOUNTAIN DIFFUSER

(71) Applicant: Pioneer Pet Products, LLC, Cedarburg, WI (US)

(72) Inventor: John M. Lipscomb, Cedarburg, WI (US)

(73) Assignee: Pioneer Pet Products, LLC, Cedarburg, WI (US)

( * ) Notice: Subject to any disclaimer, the term of this patent is extended or adjusted under 35 U.S.C. 154(b) by 1199 days.

(21) Appl. No.: 13/840,858

(22) Filed: Mar. 15, 2013

(65) Prior Publication Data
US 2014/0102309 A1 Apr. 17, 2014

Related U.S. Application Data

(60) Provisional application No. 61/713,106, filed on Oct. 12, 2012.

(51) Int. Cl.
A01K 7/00 (2006.01)
B05B 17/08 (2006.01)
A01K 7/02 (2006.01)

(52) U.S. Cl.
CPC .......... A01K 7/00 (2013.01); A01K 7/02 (2013.01); B05B 17/08 (2013.01)

(58) Field of Classification Search
CPC .......... A01K 1/0356; A01K 7/00; A01K 7/02; A01K 7/025; A01K 39/02; B05B 17/08; A01G 27/00; A01G 27/02; A01G 31/00; A01G 2031/006
USPC .......... 119/226, 227, 259, 69.5, 72, 74; 47/59 R, 62 R, 62 N, 79, 48.5
See application file for complete search history.

(56) References Cited

U.S. PATENT DOCUMENTS

| 2,094,268 | A |   | 9/1937 | Friedman |
| 3,272,181 | A | * | 9/1966 | Ramsey .......... A01K 7/06 119/76 |
| 3,429,125 | A |   | 2/1969 | Shotton |
| 3,521,821 | A |   | 7/1970 | Emsbach |

(Continued)

FOREIGN PATENT DOCUMENTS

| CN | 201680059 U | 12/2010 |
| CN | 201832480 U | 5/2011 |

(Continued)

OTHER PUBLICATIONS

PCT/US2013/064740, International Search Report and Written Opinion dated Feb. 6, 2014.

Primary Examiner — Lisa L Tsang
(74) Attorney, Agent, or Firm — Boyle Frederickson S.C.

(57) ABSTRACT

A water diffuser that extends from the discharge outlet of a pet fountain, for receiving water from the outlet of the pet fountain's water pump, wherein the diffuser includes a perforate tubular diffuser section that can be releasably coupled or otherwise anchored to part of the fountain by a connecting or coupling section that preferably is tubular and imperforate. The diffuser can include a water treatment disposed within the diffuser that is dispensed or released into water flowing through the diffuser. The diffuser may also include a filter for removing contaminants from water flowing through the water. Where used together with a water treatment, the filter can be disposed within the diffuser upstream of the water treatment for filtering water flowing through the diffuser before treating the flowing water.

25 Claims, 9 Drawing Sheets

(56) References Cited

U.S. PATENT DOCUMENTS

| | | | |
|---|---|---|---|
| 4,305,828 A * | 12/1981 | Heublein | C02F 1/645 |
| | | | 119/231 |
| 4,340,179 A * | 7/1982 | Knapp | A01C 23/042 |
| | | | 239/310 |
| 4,970,880 A | 11/1990 | Luger | |
| 5,246,571 A * | 9/1993 | Woltmann | A01K 63/045 |
| | | | 116/267 |
| 5,533,300 A * | 7/1996 | Kesler | A01G 29/00 |
| | | | 47/48.5 |
| 5,842,437 A | 12/1998 | Burns | |
| 5,947,058 A * | 9/1999 | Chen | A01K 63/047 |
| | | | 119/249 |
| 5,996,906 A | 12/1999 | Cooper | |
| 6,051,132 A | 4/2000 | Flores | |
| 6,192,623 B1 * | 2/2001 | Higginbotham | A01G 29/00 |
| | | | 47/48.5 |
| 6,202,597 B1 * | 3/2001 | Hsiung | A01K 63/045 |
| | | | 119/259 |
| 6,210,573 B1 | 4/2001 | Marshall | |
| 6,450,122 B1 * | 9/2002 | Frank | A01K 63/006 |
| | | | 119/255 |
| 6,526,916 B1 * | 3/2003 | Perlsweig | A01K 7/06 |
| | | | 119/74 |
| 7,430,988 B2 * | 10/2008 | Perlsweig | A01K 7/022 |
| | | | 119/75 |
| 7,591,233 B2 * | 9/2009 | Vaccari | A01K 63/042 |
| | | | 119/259 |
| 7,690,585 B1 * | 4/2010 | Johns | A23G 3/22 |
| | | | 239/16 |
| 7,849,817 B1 * | 12/2010 | Warganich | A01K 7/02 |
| | | | 119/74 |
| 8,011,324 B1 | 9/2011 | Warganich | |
| 2008/0190374 A1 | 8/2008 | Farris | |
| 2010/0300366 A1 * | 12/2010 | Lipscomb | A01K 45/002 |
| | | | 119/74 |
| 2011/0000976 A1 | 1/2011 | Roide | |
| 2011/0067638 A1 * | 3/2011 | Lipscomb | A01K 7/02 |
| | | | 119/74 |
| 2011/0259273 A1 | 10/2011 | Lipscomb et al. | |
| 2012/0018016 A1 | 1/2012 | Gibson et al. | |

FOREIGN PATENT DOCUMENTS

| | | | | |
|---|---|---|---|---|
| DE | 102009013619 | | 9/2010 | |
| GB | 2200901 A | * | 8/1988 | A01K 7/02 |
| WO | 2007055988 | | 5/2007 | |
| WO | 2009154486 | | 12/2009 | |
| WO | 2011035320 | | 3/2011 | |

* cited by examiner

PET FOUNTAIN DIFFUSER

CROSS REFERENCE

This application claims priority in U.S. Provisional Patent Application No. 61/713,106, filed Oct. 12, 2012 the entirety of which is hereby expressly incorporated herein by reference.

FIELD

The present invention is directed to a water diffuser for use with a pet fountain for a household pet and, more particularly, to a diffuser that is received within the discharge spout of a recirculating water fountain as to allow moving water to pass through the diffuser during fountain operation.

BACKGROUND

Pet fountains that create flowing water for attracting pets are well known and there have been a number of commercially successful pet fountains. Exemplary pet fountains generally include a spout for providing a continuous flow of water from a reservoir to a container such that the pet is able to drink either directly from the flowing water stream or from the container. The stream of flowing water is formed as water flows from an elevated spout down into the lower positioned container.

Electronic pumps are commonly used to recirculate water within the pet fountain, by means of drawing water from the container and pushing the water through the spout. The movement of the water, generated by the pump, also allows for the water to pass through an internal filter to remove contaminants from the water as it is recirculated through the fountain.

One of the drawbacks of conventional pet fountains, such as those described above, is that they limit water movement. To allow a pet easy access to the flowing water, the outer surface of the pet fountain, along which the water travels, is not covered. As a result, the force with which the water exits the spout must be limited to prevent water overflowing onto or splashing the area surrounding the pet fountain. However, this limitation on the force of discharged water decreases the sound and movement of the flowing water, which is useful in attracting pets to the fountain.

As a result, efforts have been made to design and manufacture pet fountains with an outer surface that decreases water overflow and splashing while simultaneously maximizing water movement and sound. For example, one proposed pet fountain is composed of a basin for holding a volume of water and a cover that sits atop the basin. The cover has a recessed portion that forms a drinking bowl for holding a smaller volume of water which, in combination with the basin, provides two different water supplies from which a pet may drink. A pump is contained beneath the cover and is operative to draw water from the basin and pump it to the drinking bowl within the cover via an elevated stream. As the volume of water pumped to the cover exceeds the holding capacity of the drinking bowl, water begins to waterfall from the cover back into the basin creating both movement and sound.

While such pet fountain designs improve the movement of water along the outer surface of the fountain, they are still limited in that the water is kept in close proximity to the fountain's outer surface while it flows into the basin. Thus there is need for an apparatus which elevates the water above the discharge spout, to increase the water's movement and sound to attract a pet, while preventing undesirable splashing or overflow in the area around the pet fountain.

SUMMARY

A drawback of conventional pet fountains is their inability to effectively supplement the water that is being recirculated. Drinking water offers an easy and efficient means for supplementing a pet's diet with various nutritional additives such as minerals, vitamins, or medicine. Alternatively, water can also be scented or flavored to improve its appeal. In the past, such supplements have been added to pet drinking water by hand, with the pet's owner actively mixing the supplement into the pet's drinking water. However, in a typical pet fountain, it is not possible to know if such hand added supplements are maintained in suspension within the drinking water, or if they fallen out of suspension to the point where they are no longer capable of being consumed in the drinking water. Similarly, the decrease in the supplement's medicinal efficacy or desirable scent or flavor may also be hastened by the constant movement of the recirculating water. Thus there is need for an apparatus which directs moving water over a dissolvable supplement to control the elongated release of an effective supplement into the drinking water.

The present invention is directed to a water diffuser that is inserted within the discharge spout of a pet fountain, for receiving water from an outlet of the water pump of the pet fountain. The diffuser includes a connecting section that is configured to be inserted into the discharge of the pet fountain at one end and receives a perforated tubular diffuser section at an opposing end. The diffuser can be further configured to house a dissolvable supplement within the interior of the diffuser section that dissolves and releases a supplement into the water as water flows through the diffuser.

The diffuser may be configured as a tubular conduit formed of a connecting section, which is imperforated, and a diffuser section, which is perforated. The tubular conduit is hollow and includes an elongated passage therein defined by the inner surface of the conduit sidewall. The diffuser receives water from the water pump outlet at the connecting section. The water is directed along the elongated passage, where it flows into the perforated tubular diffuser section. The flowing water then proceeds to exit the elongated passage by way of the various perforations disposed throughout the sidewall of the diffuser section. In use, the diffuser can be oriented substantially vertically, such that water travels upwards when in the elongated passage, and then falls downward via gravity towards the pet fountain after exiting the perforations. The limited force entered by the pet fountain water pump and the construction of the diffuser cause the exiting water to be maintained in relatively close proximity to the outer surface of the diffuser sidewall as the water false, to limit splashing or overflow.

In one embodiment, the diffuser has a tubular diffuser section composed of a perforated sidewall formed of a mesh or woven material that preferably is made of plastic, such as nylon, having perforations integrally formed resulting from the weave of the material through which the moving water can pass and be detected substantially along the outer surface of the diffuser sidewall, towards the pet fountain. In a preferred perforated tubular mesh diffuser embodiment, its perforated sidewall is made of a biaxially woven plastic, such as preferably plastic braided wire sleeving or tubing, the produces a resilient, durable and tough diffuser capable of withstanding being bitten by an animal, such as a cat.

The hollow interior of the perforated tubular diffuser section provides a chamber for holding an insert that can be made in a manner so as to shed or dissolve in water flowing through the diffuser during fountain operation. In one preferred embodiment, the diffuser receives and holds an insert formed of material that can be granular that can be dispensed from the tubular diffuser such as by shedding particles into water flowing through the diffuser that are then carried out into drinking water in the fountain. One example of such an insert capable of shedding is a block of material that includes a binder that holds granular or particulate material that breaks off or sheds from the block as water flowing through the diffuser impinges the block. Such a block can be formed of a water soluble binder that dissolves or erodes over time as water flows through the diffuser causing the particles or grains of material to break free from the block and be carried away by water flowing through the diffuser. In one preferred embodiment, such a block has a water soluble binder, e.g., adhesive, which holds particles or pieces of catnip with the binder eroding and/or dissolving as water flows through the diffuser carrying pieces or particles of catnip with it that pass through perforations in the diffuser.

In another preferred embodiment, the diffuser receives and holds an insert that is a dissolvable supplement therein. One preferred insert can be solid block formed of a water soluble binder impregnated with catnip oil that dissolves into water flowing through the diffuser during pet fountain operation. Another preferred insert can be formed of a mineral block sized for receipt in the insert-receiving chamber of a dispensing embodiment of the diffuser constructed in accordance with the present invention. A still further preferred insert can include vitamins and/or minerals in a dissolvable matrix that can be water soluble that dissolves causing the vitamins and/or minerals to go into solution in the water flowing through the diffuser that readily can be absorbed by an animal drinking water in the fountain that has passed through the diffuser.

Such a perforated tubular diffuser section construction advantageously enables water and an insert that is a dissolvable supplement to be dispensed through perforations that integrally result from the weave of the material. Such construction further allows the perforated tubular diffuser section to flex or bend in response to a pet's physical interaction with the diffuser, and return to its original position when not manipulated by a pet. Such a perforate tubular diffuser that receives such an insert in the hollow that is an insert holding chamber within defines a dispenser with such a perforate tubular diffuser comprising a dispenser forming a dispensing perforate tubular diffuser constructed in accordance with the present invention.

If desired, such a dispensing perforate tubular diffuser can be detached from its imperforate tubular connection that removably seats in the pet fountain discharge spout enabling insertion of a new insert into the insert holding hollow chamber within the perforate tubular diffuser when a prior insert has been completely used up. Alternatively, the free end of the perforate tubular diffuser can be removable to enable insertion of a new insert into the dispensing chamber of the perforate tubular diffuser when the prior insert has been used up.

In one preferred embodiment, the diffuser section defined chamber is has a generally circular cross-section that can be oblong or oval in cross-section when at least partially filled with a dissolvable supplement. In a currently preferred embodiment, the diffuser section is closed at its end opposite the connecting segment, as to retain the dissolvable supplement therein. The end may be permanently closed, such as by heat sealing or adhesively bonding the end of the tube. In a preferred embodiment, the diameter of the connecting section is less than the diameter of the diffuser section, as to prevent the dissolvable supplement from exiting the chamber via the open end of the elongated passage as the connecting segment.

The tube sidewall that forms the perforated tubular diffuser section is of endless construction being composed of a mesh or mesh like material that preferably is comprised of plastic, such as nylon, that is of durable and resilient construction. In a preferred embodiment, the sidewall is made of a woven or braided material that preferably is bi-axially woven of a plurality of pairs of elongate filaments producing a tube that deforms when subjected to stress or strain in a manner that changes the size of at least some of the perforations formed in the sidewall. Such an endless sidewall construction produces a dissolvable supplement retaining chamber that is diametrically collapsible or compressible when subjected to stress or strain in a longitudinal direction enabling the diffuser to deform at a local region of the sidewall when the local region or a region adjacent the local region is subjected to a stress or strain.

For example, when an animal, such as a cat, directly interacts with the diffuser section by biting it, grasping it, bending it, or otherwise physically engaging the sidewall, any local compression or bending of the tubular sidewall causes the perforations therein to expand and results in the increase volume of water and supplement infused water passing through perforations in the sidewall at or along the region of engagement by the animal. Such physical engagement of the diffuser section by an animal facilitates dispensation of dissolved supplements through perforations in the sidewall by causing at least some of the perforations in a region of the sidewall at or adjacent the location of physical engagement to increase in size a larger volume of water and supplement infused water to pass through them.

Physical engagement of the diffuser section by the animal also facilitates dispensation of the dissolvable supplement by causing movement of at least some of the solid dissolvable supplement within the diffuser relative to the elongate filaments forming the tube sidewall as well as relative to other particles or granules of dissolvable supplement within the diffuser. Such relative movement not only forces some of dissolvable supplement into fluid suspension, it also causes some of the particles or solid dissolvable supplement to be ground up into smaller or finer particles that more readily are dissolved by way of contacting the adjacently flowing water.

In a preferred embodiment, the diffuser section tubular sidewall is formed of filament bundles each comprised of a plurality of elongate filaments that extend substantially the length of the diffuser section sidewall. Such a sidewall is comprised of a plurality of elongate filament bundles arranged at an acute angle relative to the longitudinally extending central axis of the diffuser such that one of the filament bundles overlaps another one of the filament bundles when woven or braided to form the tubular sidewall. In one preferred embodiment, each filament bundle is formed by at least three elongate filaments that extend from one end of the diffuser section to the other end of the diffuser section in a helical or spiral arrangement.

In such a preferred embodiment, there is a first plurality of pairs of elongate generally parallel filament bundles arranged in a helix or spiral about a longitudinally extending center axis of the diffuser at a first angle relative to the diffuser center axis that overlaps and is woven or braided with a second plurality of pairs of elongate generally parallel filament bundles also arranged in a helix or spiral about a longitudinally extending center axis of the diffuser. Each filament bundle is woven or braided so it alternately underlies and overlies a crossing filament bundle. In a preferred embodiment, each filament bundle is woven or braided so it alternately underlies or overlies a plurality of crossing filament bundles such that each filament bundle overlies one plurality of crossing filament bundles and then underlies another plurality of crossing filament bundles with this pattern repeated over and over again longitudinally and transversely for each filament bundle of the diffuser section sidewall.

In another preferred embodiment, the diffuser section sidewall is formed of elongate filaments that extend substantially the length of the diffuser section. Such a sidewall is comprised of a plurality of elongate filaments arranged at an acute angle relative to a longitudinal center axis of the diffuser so one of the filaments overlaps another one of the filaments when woven to form the diffuser section sidewall. In a preferred embodiment, the endless sidewall forming the diffuser section chamber in which disposable supplement is retained is made of a plurality of pairs of elongate filaments, i.e., at least three filaments, having one elongate filament extending generally axially in a first direction substantially the length of the diffuser section and having another elongate filament extending generally axially in a second direction substantially the length of the diffuser section that crosses the first elongate filament. Each one of the first and second elongate filaments is generally helical or spiral shaped defining an acute included longitudinal angle where they cross in an axial or longitudinal direction and defining an obtuse included transverse angle where they cross in a direction generally transverse to an axial or longitudinal direction of the sidewall.

In such a preferred embodiment, there is a first plurality of pairs of elongate generally parallel filaments arranged in a helix or spiral about a longitudinally extending center axis of the diffuser section at a first angle relative to the diffuser center axis that overlaps and is woven or braided with a second plurality of pairs of elongate generally parallel filaments also arranged in a helix or spiral about the longitudinally extending tube center axis. Each filament is woven or braided so it alternately underlies and overlies a crossing filament. In a preferred embodiment, each filament is woven or braided so it alternately underlies or overlies crossing filaments such that it overlies one plurality of crossing filaments and then underlies a plurality of crossing filaments with this pattern being repeated over and over again longitudinally and transversely for each filament of the diffuser section sidewall.

Such a bi-axial woven or braided sidewall construction results in perforations formed by the angles where each pair of crossing filaments or filament bundles intersect that are parallelograms that are rhombuses until the crossing filaments or filament bundles are generally perpendicular to one another at which the perforations are generally rectangular, e.g., square. Such a bi-axial woven or braided sidewall construction produces perforations whose size increases or decreases depending upon whether stress or strain placed on the diffuser section increases or decreases the length of the diffuser section either locally, such as in a local region of the diffuser section sidewall, or generally, i.e., along its entirety.

For example, where stress is applied axially that would tend to increase the length of the diffuser section, the size of each perforation at least in and along the vicinity of the applied stress tends to decrease as a result of corresponding relative movement between filaments or filament bundles that cross one another. Such applied stress tends to decrease the diameter or width of the diffuser section and its chamber contained therein, at least in and along the region of the applied stress, which also can cause dissolvable supplement within the chamber to rub against the sidewall and filaments during the application of stress and become dissolved in the adjacent moving water. Such relative movement not only forces some of the dissolvable supplement into fluid suspension, it also causes some of the particles or solid dissolvable supplement to be ground up into smaller or finer particles that more readily are dissolved by way of contacting flowing water.

In addition, the rubbing of particles of the dissolvable supplement during physical interaction with the diffuser section also result in more of the dissolvable supplement becoming suspended in the drinking water which is simultaneously flowing over the dissolvable supplement. This movement thereby releases more supplement into the drinking water at precisely the time when the pet in interacting with the pet fountain, and is therefore capable of ingesting the supplement as it is being released. In the case of a scent or flavor supplement, movement of the diffuser section can stimulate the animal physically interacting with the toy by causing at least some of the dissolved supplement to be either smelled by the animal, i.e., olfactory stimulation, or tasted by the animal, thereby rewarding the animal for physically interacting with the water diffuser.

A diffuser constructed in accordance with the present invention can have an elongate perforate tubular diffuser section that can be formed, such as by being bent or having its shape memory changed, into an arc that extends from the discharge spout outwardly and downwardly toward and even into a basin located below the bowl causing the perforate tubular diffuser section to also function as a flow guide. Such a diffuser can be shaped to extend outwardly of the discharge spout to at least overlie part of the lower basin such that it not only functions as a flow guide that guides water being discharged from the discharge spout toward the basin below but can also function as a splash-inhibitor that defines a splash guard the reduces and preferably prevents water discharged from the spout flowing through the diffuser from splashing into water in the basin below.

Another embodiment of a diffuser constructed in accordance with the present invention can include an elongate perforate tubular diffuser section having a bent, bendable, deformable or memory changed shape capable of forming an arc that extends from the discharge outlet of a pet fountain towards a basin of the pet fountain, located below the cover. Such a bent diffuser may include an internal wire or rod or an wire or rod formed integrally with the woven mesh surface of the tubular diffuser section and can be made of metal, plastic, or another material that can be deformed such as by bending, in order to shape the flow guide such as to shape the path of flow of water into the basin.

Another embodiment of a diffuser constructed in accordance with the present invention can include a rod, wire or other elongate flow guide that extends outwardly from the perforate diffuser section toward the basin so as to overlie water in the basin. Such a flow-guiding elongate wire or rod can be deformable and can extend into the water including to the bottom of the basin. Such a flow-guiding elongate wire or rod can be made of metal, plastic, or another material that can be deformed, such as by bending, in order to shape the flow guide such as to shape the path of flow of water into the basin.

DRAWING DESCRIPTION

One or more preferred exemplary embodiments of the invention are illustrated in the accompanying drawings in which like reference numerals represent like parts throughout and in which.

Figure 8:
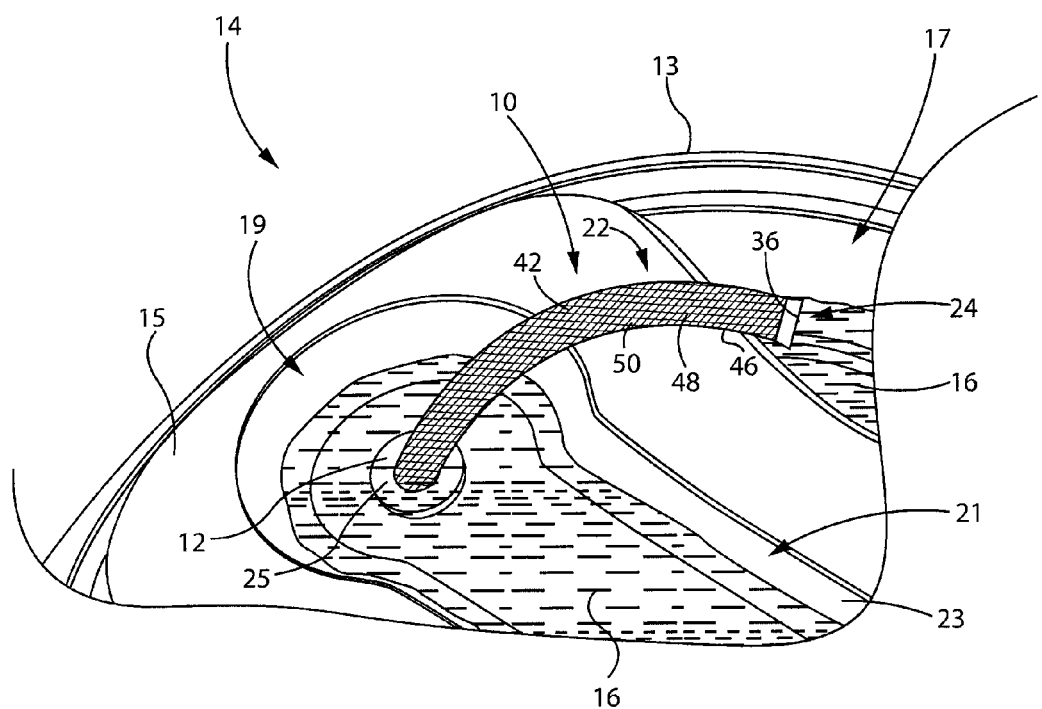
Figure 9:
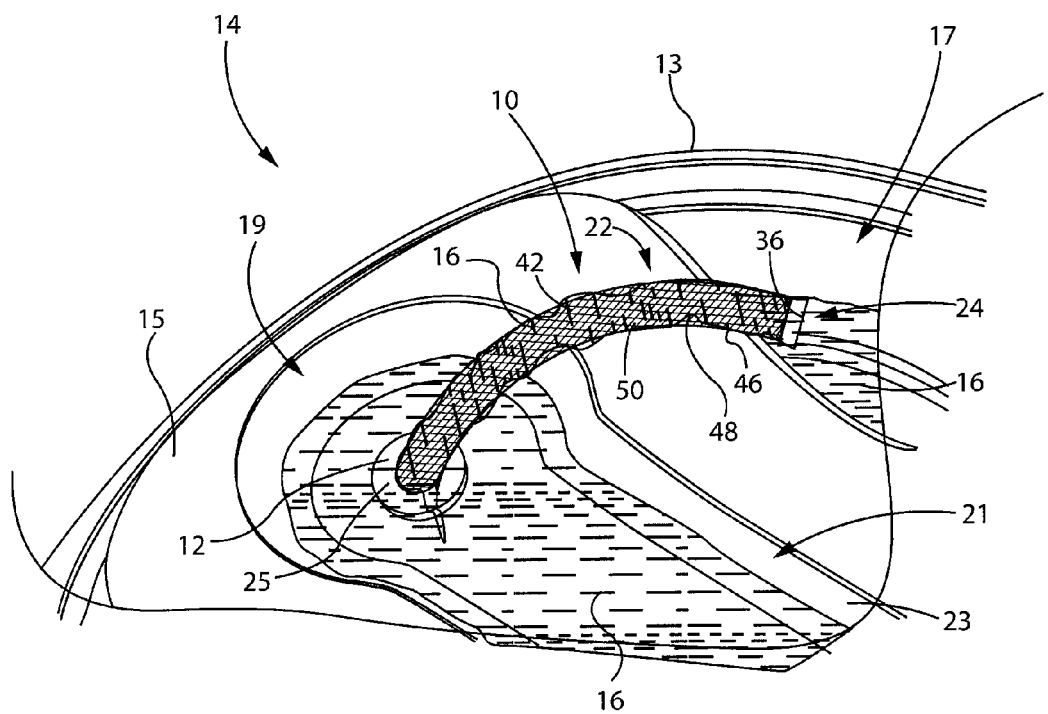

FIG. 8 is a front perspective view of an alternative embodiment of a deformable water diffuser that is received within the discharge spout of a recirculating water fountain as to allow moving water to pass through the diffuser during fountain operation in accordance with the present invention; and FIG. 9 is a front perspective view of the water diffuser of shown in FIG. 8, showing water flowing through the diffuser as the recirculating water fountain is in operation.

Figure 10:
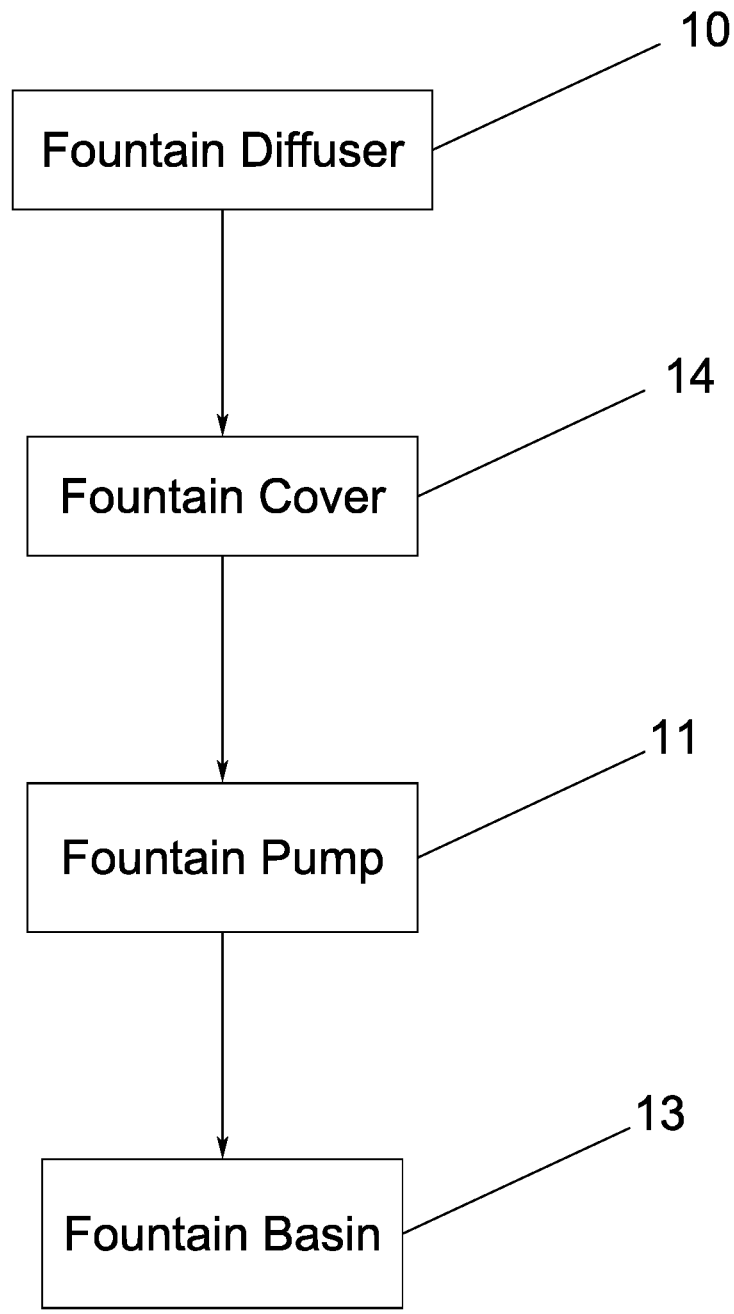

FIG. 10 is a diagram of the components of a recirculating pet fountain equipped with a fountain diffuser.

Before explaining one or more embodiments of the invention in detail, it is to be understood that the invention is not limited in its application to the details of construction and the arrangement of the components set forth in the following description and illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION

Figure 1:
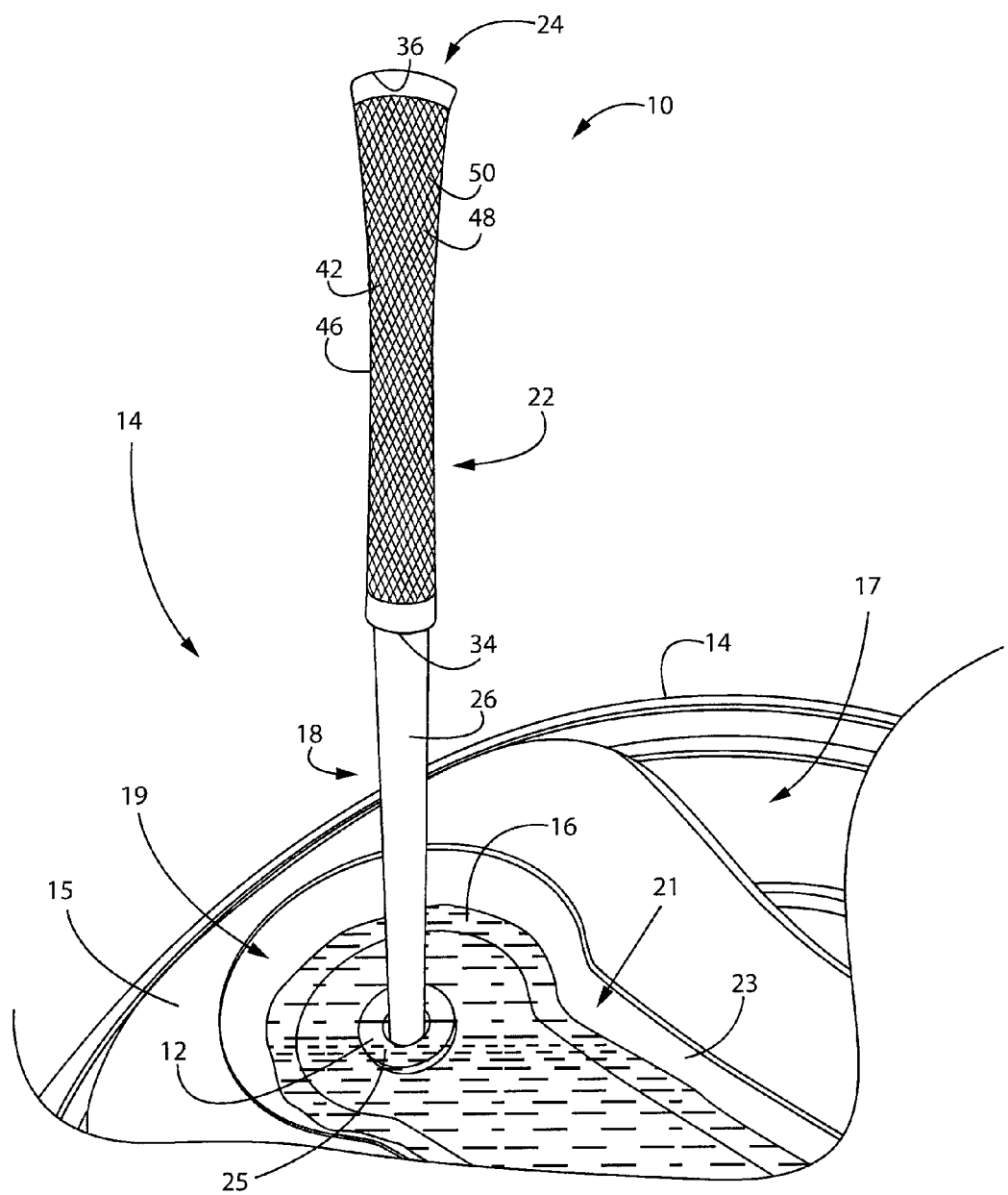
FIG. 1 is a front perspective view of water diffuser that is received within the discharge spout of a recirculating water fountain as to allow moving water to pass through the diffuser during fountain operation.
Figure 2:
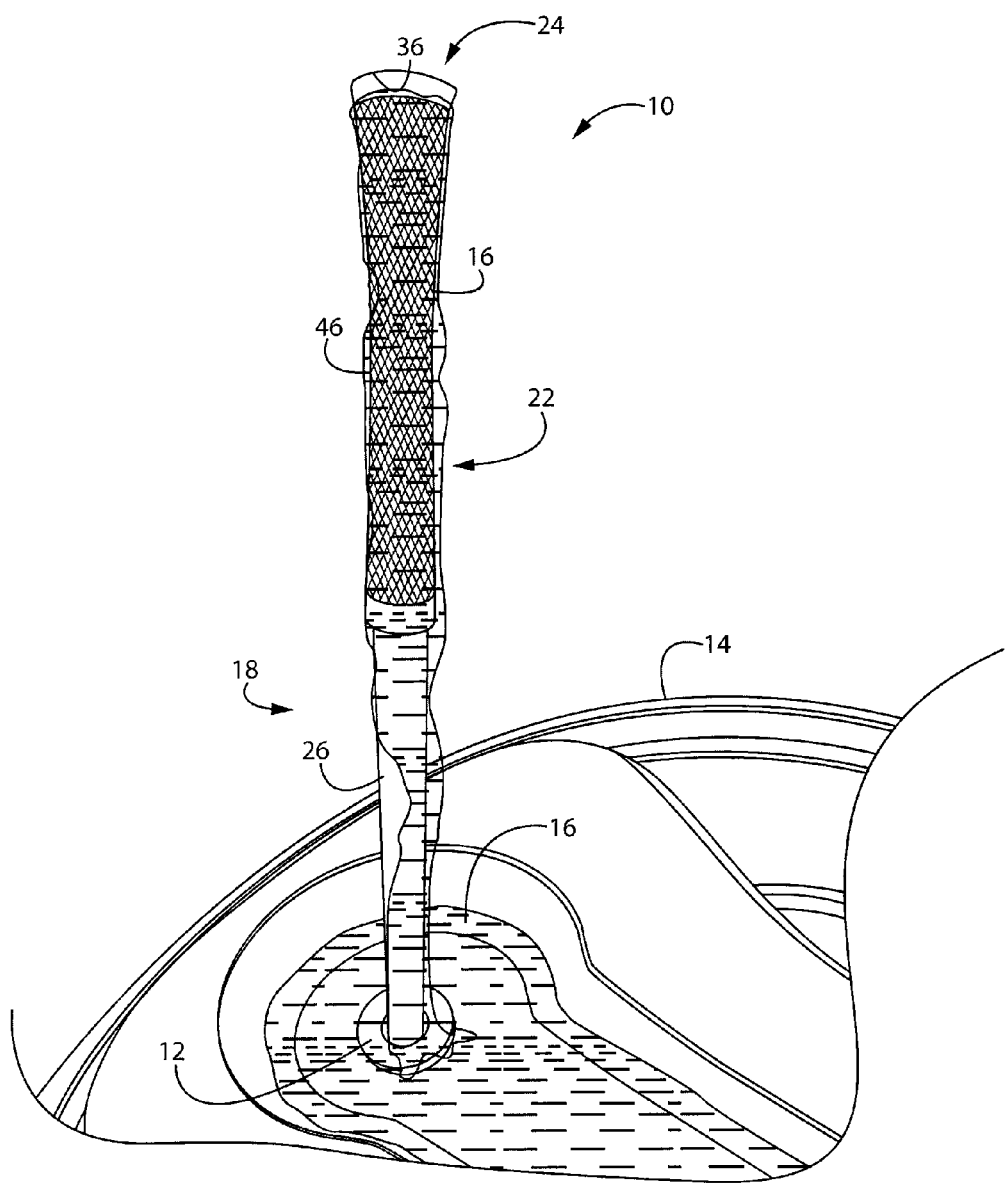
FIG. 2 is a front perspective view of the water diffuser of shown in FIG. 1, showing water flowing through the diffuser as the recirculating water fountain is in operation.

FIGS. 1-4 illustrate a preferred embodiment of a water diffuser 10 constructed in accordance with the present invention to be received within a discharge outlet 12 of a recirculating water pet fountain 14 so as to allow moving water 16 to pass through the water diffuser 10 during fountain operation. As is best shown in FIGS. 1 and 2, the fountain 14 includes a removable cover 15 having an outlet 12 into which is disposed a diffuser 10. The diffuser 10 is in liquid-flow communication with the outlet 12 such that water 16 from a pump 11 (FIG. 10) underneath the cover 15 is discharged from the diffuser 10. As shown in FIG. 2, the water 16 that is discharged from the diffuser 10 can either flow directly into an open drinking well 17 formed by part of a fountain basin 13 not enclosed by the cover 15 or along a portion of the cover 15, such as the open drinking bowl 19, spillway 21 or trough 23, and into the open drinking well 17.

With continued reference to FIG. 1, the cover 15 is removably seated on the basin 13 and can have an exposed or open drinking bowl 19 concavely formed in its exterior that can be in liquid flow communication with a spillway 21, such as in the form of a generally U-shaped trough 23, along which water 16 can flow during recirculating pet fountain operation back into the open drinking well 17 of the basin 13. An example of a preferred recirculating pet fountain embodiment for which a diffuser 10 constructed in accordance with the present invention is particularly well suited for use with is shown and described in commonly owned U.S. application Ser. No. 13/165,784, filed Jun. 21, 2011, published on Oct. 27, 2011 as U.S. Patent Application Publication No. US 2011/0259273, and which issued on Aug. 24, 2014 as U.S. Pat. No. 8,813,683, the entire disclosure of which is hereby expressly incorporated herein by reference.

With reference once again to FIGS. 3 and 4, the water diffuser 10 is elongate and generally tubular, may have a coupling or connecting section 18 adjacent a first end 20 and a perforate diffuser section 22 adjacent the opposing second end 24. The coupling or connecting section 18 can be formed of an imperforate tubular sidewall 26 that is open at both first and second ends 28, 30. The diffuser intake end 28 is configured to be received within the discharge outlet 12 of the pet fountain, as to receive flowing water 16 from the outlet of a water pump 11 (FIG. 10).

With reference once again to FIGS. 3 and 4, the water diffuser 10 is elongate and generally tubular, may have a coupling or connecting section 18 adjacent a first end 20 and a perforate diffuser section 22 adjacent the opposing second end 24. The coupling or connecting section 18 can be formed of an imperforate tubular sidewall 26 that is open at both first and second ends 28, 30. The diffuser intake end 28 is configured to be received within the discharge outlet 12 of the pet fountain, as to receive flowing water 16 from the outlet of a water pump (not shown).

With specific reference to FIG. 1, such an outlet 12 can be formed of or include a diffuser seat 25 that together with the coupling or connecting section 18 of the diffuser 10 defines a releasable diffuser coupling when engaged therewith. As is shown in FIGS. 1 and 2, the diffuser seat 25 can take the form of an annular seal that can be a sealing grommet of elastomeric construction, e.g., rubber, silicone rubber or the like, which not only receives and releasably retains one end of the diffuser 10 therein but which can also be tubular and extend downwardly below the cover 15 to form a fluid-tight coupling with the pump (not shown) that can help anchor the cover 15 to the basin 13, such as in the manner disclosed in U.S. Patent Application Publication No. US 2011/0259273. Such a diffuser seat 25 can be and preferably is configured to at least frictionally engage part of the outer surface of the tubular sidewall 26 of a diffuser 10 that is telescopically inserted into the seat 25. As a result, a water-tight seal can be and preferably is produced between the tubular diffuser sidewall 26 and diffuser seat 25 with the diffuser seat 25 and the diffuser connecting section 18.

The other end 30 of the fountain connecting section 18 is connected to the perforate diffuser section 22 such as by telescopic engagement there between. The imperforate sidewall 26 of the connecting section 18 may be formed of a bendable, pliable or otherwise positionable material, so as to allow the direction and orientation of the water diffuser 10 to be changed such as to direct water 16 flowing from the diffuser 10 to be directed into the upper bowl 19, along part of the spillway 21, and even into the open drinking well 17, as will be described in further detail below. Such a bendable or formable coupling section 18 enables the angle of the perforate diffuser section 22 relative to the direction of water discharged from the outlet 12 to be changed to direct water 16 exiting the diffuser 10 where a user desires. This also enables a user to adjust the angle and/or position of the perforate diffuser section 22 to reduce or even prevent splashing if desired. Such a bendable or formable connecting section 18 can also be used to adjust the position of the diffuser 10 relative to the basin 13 of the pet fountain 14 to prevent water from splashing or overflowing beyond or outside of the pet fountain 14.

Where it is desired for a diffuser 10 constructed in accordance with the present invention to include a fountain connecting section 18, such a connecting section 18 can be formed of part or all of a conventional drinking straw or drinking tube, which can be made of plastic. Where it is desired for at least a portion of the connecting section 18 to be constructed or configured in a manner permitting it to be bent or otherwise formed, such as discussed herein, the coupling section 18 can include a flexible portion which can be formed like the flexible portion of the drinking tube or straw shown and described in U.S. Pat. No. 2,094,268, the entire disclosure of which is hereby expressly incorporated herein by reference.

Figure 3:
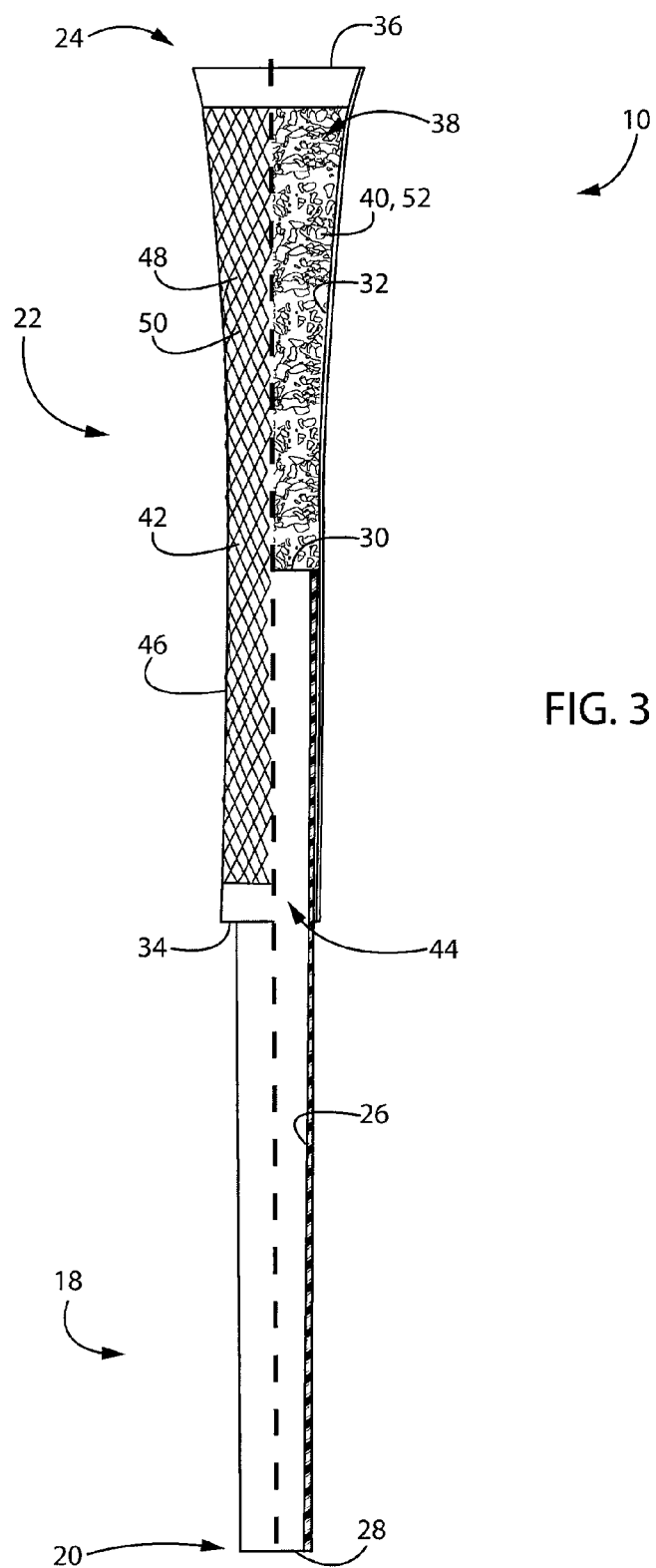
FIG. 3 is a partial cross sectional view of the water diffuser shown in FIG. 1-2 having a disposable supplement housed therein.

The diffuser section 22 is formed of a tubular perforated sidewall 32 that is open at an intake end 34, which is disposed in engagement with the connecting section 18, and which may be closed at its opposite or second end 36. As best shown in FIG. 3, the interior of the tubular perforated sidewall 32 defines a hollow perforated holding chamber 38 that may hold a water treatment dispenser 40 and/or filtration media 52 therein. In the preferred embodiment shown in the drawing figures, the perforated sidewall 32 includes at least a plurality of pairs of perforations 42 through which water 16 may exit the water diffuser 10. In this configuration, the hollow tubular connecting section 18 and diffuser section 22 combine to define an elongated passage 44 through which flowing water 16 passes during operation of the pet fountain 14.

In a currently preferred embodiment, the water treatment dispenser 40 inside the chamber 38 is configured to release a water treatment into the water 16 used to improve the wellness or welfare of the pet drinking from the water 16. Such a dispenser 40 can take the form of a cartridge or the like from which a water treatment is released or dispensed. Such a dispenser 40 can also be formed substantially completely of the water treatment itself, such as a dissolvable water treatment. The water treatment is a water treatment material that can take the form of a particulate or granular material, e.g., powder, a solid, e.g., pressed tablet, block, etc, a capsule or plurality of capsules, a liquid, a gel, or another suitable form. Water flowing through the diffuser 10 during pet fountain operation receives and carries water treatment from the dispenser 40 into the drinking well 17 treating the water 16 in the drinking well 17 before it is drunk by a pet, such as a dog, cat or another animal, thereby allowing the pet to consume the treatment. The water treatment can be in the form of particles, granules, powder, liquid or the like that can dissolve in the water as the water flows through the diffuser 10 as well as while the water 16 is flowing toward the drinking well 17 via the open drinking bowl 19, spillway 21 or trough 23 and while disposed in the well 17. As a result, water 16 flowing through the diffuser 10 that reaches the drinking well 17 is treated with water treatment from the dispenser 40 such that the treated water in the drinking well 17 drunk by a pet treats the pet or administers a treatment to the pet.

Such a water treatment can take the form of a supplement, such as a vitamin supplement containing a plurality of vitamins, a mineral supplement containing a plurality of minerals, a food supplement, a nutritional supplement, and/or a dietary supplement; a medicament, e.g., a medicinal supplement or medicine, such as in the form of a drug or medicine used to treat a pet ailment, condition or disease; and/or an adjuvant, such as in the form of one or more herbs, phenols, or other organic materials. The water treatment material can include an animal attractant, such as in the form of a scent and/or flavor. One suitable animal attractant that can be used as the water treatment or a component of a water treatment dispensed by dispenser 40 is powdered or compressed catnip, e.g., nepeta, or catnip formulation. Another suitable animal attractant that can be used as the water treatment or a component of a water treatment dispensed by dispenser 40 can take the form of an oil, such as catnip oil, e.g., nepetalactone, or another oil that can be aromatic, impart a taste to the water, and/or otherwise treat the water in a manner that attracts a pet.

Where the water treatment released or dispensed by the dispenser 40 is dissolvable or includes a dissolvable component, movement of water 16 over the surface and/or through the dispenser 40 will cause dissolvable water treatment to be dissolved into a water based suspension—the water flowing through the diffuser 10. It is contemplated that a diffuser 10 constructed in accordance with the present invention with a replaceable or refillable dispenser 40 can be configured as an animal activated treatment device where movement of the perforate diffuser section 22, such as by means of physical manipulation by a pet, e.g., bending, batting, swatting, chewing, etc., initiates release of water treatment from the dispenser 40 into water flowing through the diffuser 10. In such an embodiment after release of the water treatment has been initiated or in another preferred embodiment, such manipulation of the perforate diffuser section 22 by an animal can accelerate or increase the rate at which water treatment is dispensed from the dispenser 40 and enters the water. Where animal interaction causes or accelerates dispensing of water treatment from the dispenser 40, a diffuser 10 constructed in accordance with the present invention configured to removably hold a replaceable or refillable dispenser 40 can thereby be configured to provide animal activated release or animal activated control of the release of the water treatment if desired.

Figure 6:
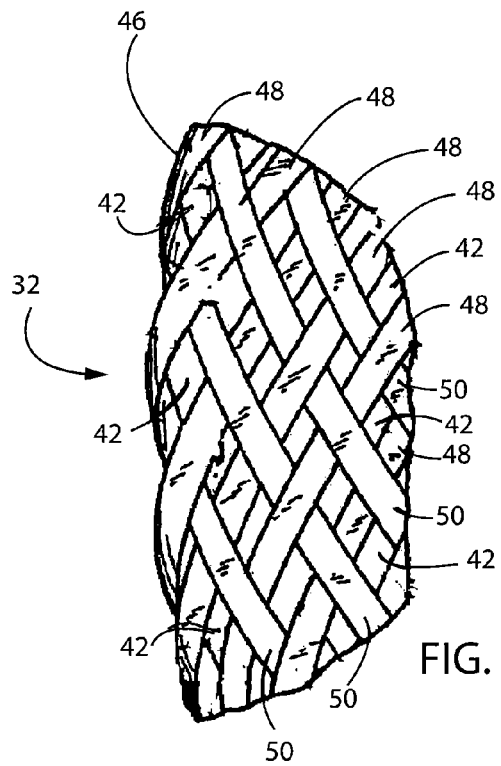
FIG. 6 is a an enlarged fragmentary view of a portion of the perforated sidewall defining a perforation formed therein whose size increases or decreases in response to deflection or deformation of the water diffuser device during animal interaction therewith.
Figure 7:
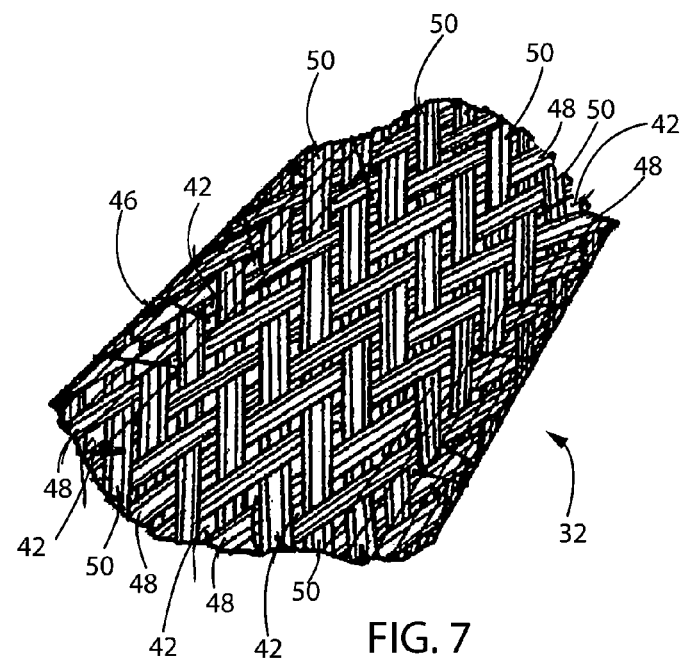
FIG. 7 is an enlarged fragmentary view of a portion of the perforated sidewall of the water diffuser device shown in FIGS. 1-4.

As seen in detail in FIGS. 6 and 7, the sidewall 32 of the diffuser section 22 is made of a woven or braided material 46 that defines a sidewall 32 of endless construction. In a preferred embodiment, the water diffuser 10 comprises a diffuser section 22 that defines a chamber 38 within its endless sidewall 32. In a preferred embodiment, the woven or braided material 46 is a plastic mesh or mesh-like material made of nylon or another similarly durable material capable of withstanding biting, clawing, chewing, scratching and the like typically encountered during with a pet or animal. The section of sidewall 32 is provided from a roll or drum of such woven or braided tubing that is cut to the desired size, such as by thermally cutting the diffuser section 22 in a manner that also substantially simultaneously seals its second end 36. The woven or braided sidewall material 46 is of mesh-like construction having perforations 42 having a length of between one-eighth millimeter and one millimeter and a width of between one-eighth millimeter and one millimeter whose size can dynamically vary in response to force applied by an animal or person that alters the shape of the diffuser section 22 of the water diffuser 10 in some manner. Such dynamic variation of perforation size in response to applied force, e.g., stress and/or strain, advantageously helps dissolve the dissolvable supplement in real time during physical interaction of a pet with the diffuser section 22 rewarding the pet with a increased release of the water supplement, which may be smelled and tasted by the pet while the pet is drinking at the water diffuser 10.

The perforations 42 are defined on adjacent sides by filaments 48, 50 of the bi-axially woven material 46 that forms the endless sidewall 32. The material 46 is formed from a plurality of elongate helical or spiral filaments 48 oriented at a first angle relative to a longitudinally extending axis that are movable relative to one another and relative to another plurality of elongate helical or spiral filaments 50 oriented at a second angle relative to the longitudinally extending axis. The filaments 48 and 50 are designed to move or slide relative one another in response to the application of force to the diffuser section 22 such as during physical interaction with the diffuser section 22 by a pet while drinking at the water diffuser 10. In a resting orientation, the relatively movable filaments 48 and 50 of the bi-axially woven material 46 are helically or spirally arranged relative to a longitudinal axis that can be a central axis of the water diffuser 10 and can be braided or woven so as to be located relatively tightly relative to one another minimizing the size of the perforations or pores 42 relative to the size of the dispenser 40 so that the dispenser 40 remains within the chamber 38 at least until the water treatment is substantially exhausted. As such, in this resting orientation, in which no external force is applied to the diffuser section 22, the bi-axially woven material 46 forms a perforated sidewall 32, wherein the perforations 42 located between the relatively movable filaments 48 and 50 have a minimal size.

In one embodiment, the minimal sizes of the perforations 42, in the resting orientation, are smaller than the average size of particles of a particulate, granular, or solid water treatment material of or dispensed by a dispenser 40 contained within the chamber 38. That is to say, in the resting orientation, the endless sidewall 32 prevents substantially all solid particles or granules of such a water treatment material of or dispensed by such a dispenser 40 from passing through the sidewall 32, without first dissolving into the flowing water 16.

In one preferred embodiment, the sidewall 32 is formed of a plurality of filaments 48 arranged in a first helical or spiral filament bundle that extends substantially the length of the diffuser section 22 and a plurality of filaments 50 arranged in a second helical or spiral filament bundle that extends substantially the length of the diffuser section 22. Each filament bundle is formed of a plurality of elongate filaments arranged in a spiral about a longitudinally extending axis, e.g., center or central axis, and extends substantially the length of the diffuser section 22. While the diffuser section 22 of the water diffuser 10 of the present invention uses bundles of helical or spiral filaments 48 and 50 woven or braided together in a bi-axial weave or braid, it should be recognized that single filaments 48 and 50 could be woven or braided together in a bi-axial weave or braid to form the sidewall 32 of diffuser section 22. In a preferred embodiment, the first and second acute angles are generally the same.

Each filament or filament bundle 48 is woven or braided with filaments or filament bundles 50 so it overlaps a plurality of filaments or filament bundles 50 as shown in FIG. 7. Conversely, each filament or filament bundle 50 is woven or braided with filaments or filament bundles 48 so it overlaps a plurality of filaments or filament bundles 48 as is also shown in FIG. 7. As a result, the crossing where each filament or filament bundle 48 overlaps or underlies a filament or filament bundle 50 produces oppositely extending acute angles that are disposed or generally aligned in a longitudinal direction relative to the diffuser section 22 as shown in FIG. 3. Each pair of adjacent and generally parallel filaments or filament bundles 48 woven with an adjacent and generally parallel crossing filaments or filament bundles 50 produces a perforation 42 that is shaped generally like a parallelogram that preferably is a rhombus or generally rhomboid-shaped. Such a perforation 42 can change its shape in response to force applied to the diffuser section 22 such as by a pet playing with the water diffuser 10, such as by biting, grasping, scratching, clawing or kicking it, which in turn changes its size enabling more or less supplement infused water 16 to pass through the perforation 42. For example, where force is applied that compresses at least a portion of the diffuser section 22 locally in the region of the applied force, the size of the perforation 42 in the vicinity of the compressed portion can increase in size and change in shape to become generally rectangular—even generally square—depending on the construction of the bi-axially woven or braided sidewall 32.

Still referring to FIG. 3, the chamber 38 is intended to be filled with a replaceable or refillable dispenser 40 containing water treatment to be dispensed by or from the dispenser 40. In one embodiment, the particulate size or grain size of the water treatment material of or dispensed by the dispenser 40 is greater than that of the plurality of perforations or pores 42 formed between adjacent sets of crossing filaments or filament bundles 48 and 50 of the bi-axially woven material 46, such as can occur when the diffuser section 32 has been deformed by a pet during play with the water diffuser 10. The size of such particles or granules of dissolvable water treatment material of or dispensed by dispenser 40 limits the ability of the particles or granules to pass through the perforated sidewall 32, without the particles or granules first dissolving in the water 16. Such a diffuser 10 constructed in accordance with the present invention holding such a dispenser 40 comprised of a water treatment dispensed in the form of particles or granules of water treatment material in effect also functions as a dispenser in its own right where the pore or perforation sizes of its perforate sidewall 32 help retain the water treatment particles or granules in the diffuser 10 until they dissolve in the water passing through the diffuser 10.

Furthermore, the manipulation of the diffuser section 22 by the pet not only can increase the rate at which the water treatment is released by the dispenser 40 into the water 16. Where the dispenser 40 and water treatment material are one and the same formed of a solid material, the abrasive force of the filaments 48, 50 during manipulation of the diffuser 10 by the pet, producing relative movement between the filaments 48, 50 and the dispenser 40 acts on the water treatment, causing it to abrade or otherwise break into particles or grains or cause particles or grains to break off, can also increase the rate at which the water treatment is released into the water 16.

Figure 4:
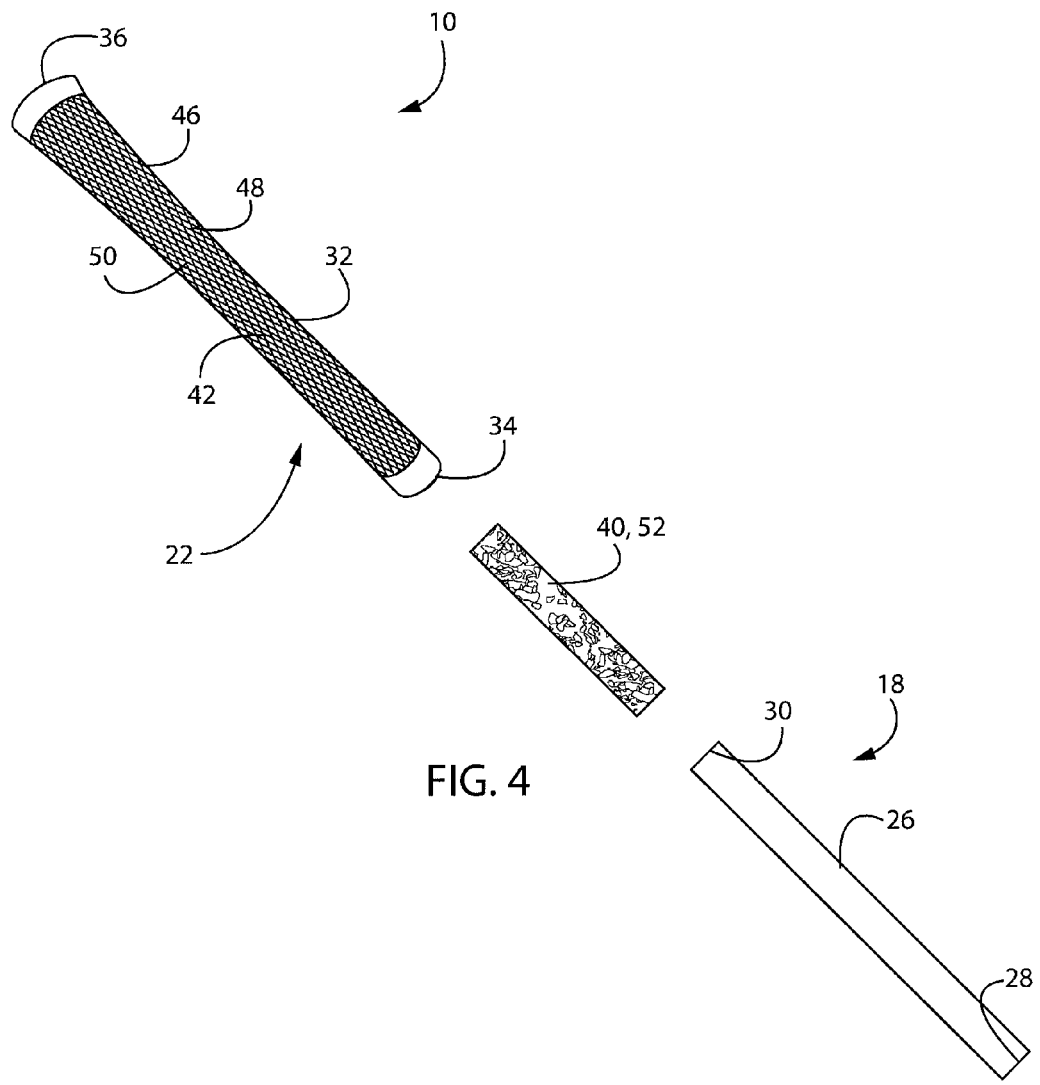
FIG. 4 is an exploded view of the water diffuser shown in FIGS. 1-3 having a filter media or dispenser.
Figure 5:
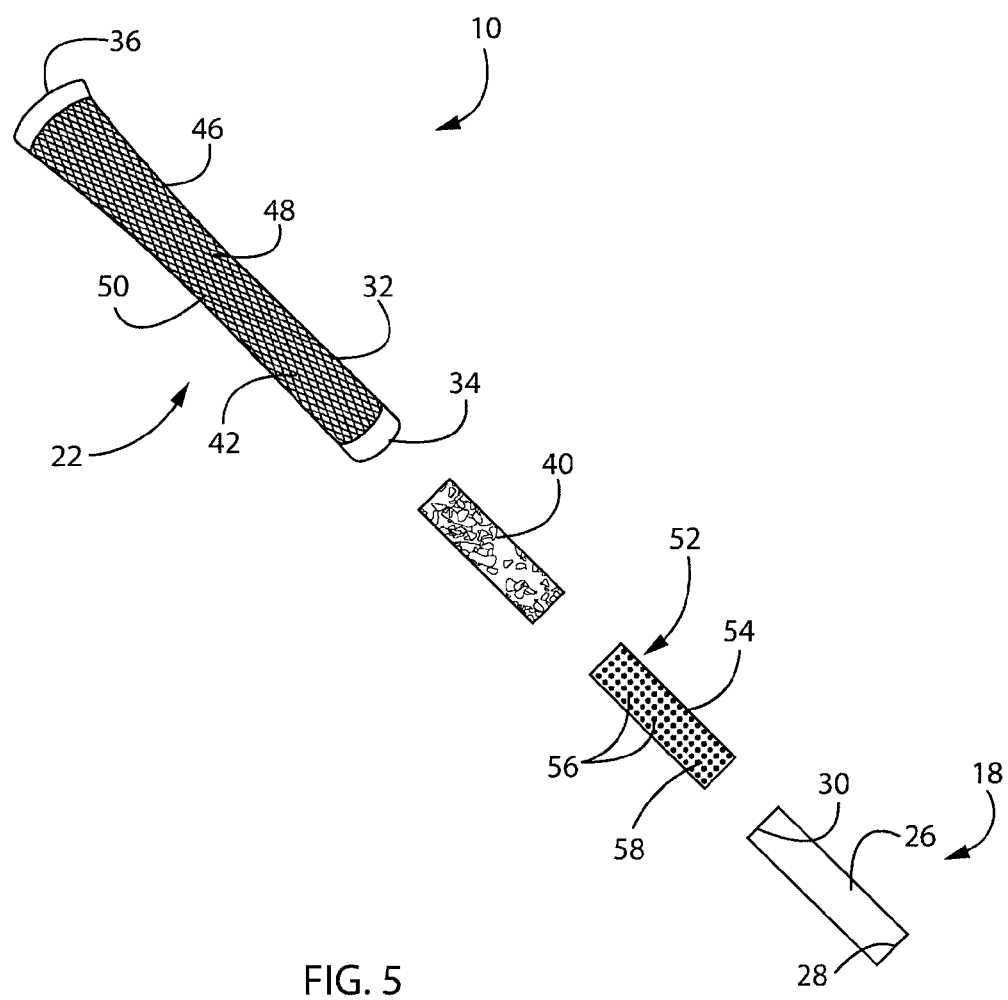
FIG. 5 is an exploded view of an alternative embodiment of the water diffuser shown in FIGS. 1-3, having both a filter media and dispenser.

In another preferred embodiment, as seen in FIG. 4, the diffuser 10 can include a filter 52. With reference to FIGS. 3-5, where equipped with a filter 52, the filter 52 can include or be formed of a filtration media 54 designed to isolate contaminants out of the water 16 that exists the perforations 42 of the diffuser section 22. The filtration media 54 may be formed of a fibrous filter material including a plurality of pores 56 disposed between adjacent filter filaments 58. The pores 56 of the filter material 54 are preferably of a sufficiently small diameter as to allow water 16 to pass through the pores 56, while simultaneously blocking or impeding the flow of contaminants. If desired, the filtration media 54 can include or may be formed of a chemical filter material such as a charcoal filter. In such an embodiment, the chemical filter material may be formed of multiple discrete granules or particulates of the chemical filter material, as to maximize surface area of the filtration media 54 in contact with the passing water 16. Preferably, such chemical filter granules or particulates are of a diameter larger than one millimeter is to be retained within the chamber 38 without passing through the perforations 42 when the diffuser section 22 is either in a resting configuration is being physically manipulated by a pet.

Where the diffuser 10 includes such a filter 52, the filter 52 is housed within the diffuser 10 which can come prepackaged with the filter 52. Where the diffuser 10 includes such a filter 52, the filter 52 preferably is disposed within the chamber 38 but can also be disposed upstream of the chamber 38, such as by being received in the coupling section 18.

Referring now to FIG. 5, where the diffuser 10 is equipped with a filter 52, it can also include a water treatment dispenser 40. If desired, such a filter 52 can be combined with a water treatment dispenser 40, disposed within the chamber 38 in the diffuser 10. In one preferred embodiment where this is the case, the filtration media 54 is located upstream of the dissolvable supplement 40 within the hollow interior chamber 38 of the water diffuser 10. In such an embodiment, the filtration media 54 preferably traps and/or removes contaminants or impurities from water 16 flowing through the diffuser 10, before the water 16 is infused with water treatment from the dispenser 40.

In addition to the filter 52, the bi-axially woven material 46 defines a perforate diffuser sidewall 32 that also functions as a filter that filters contaminants from the water 16 flowing through the diffuser 10 having a size greater than that of the pores or perforations in the diffuser sidewall 32. The woven or braided sidewall material 46 has perforations 42 having a length of between one-eighth millimeter and one millimeter and a width of between one-eighth millimeter and one millimeter, and as such impedes and can obstruct the movement of contaminants of a larger width or diameter than that of the perforation 42, and thereby allow water 16 free of such larger sized contaminants to pass through the perforations 42 when exiting the diffuser 10 at the perforate diffuser section 22. The fiber filaments 48, 50 which comprise the bi-axially woven or braded sidewall material 46 may be woven or braided in a closer relative proximity to each other to form perforations 42 of a correspondingly smaller width and length to thereby filter out correspondingly smaller sized particulate contaminants from the flowing water 16. Such filtration capabilities of the sidewall material 46 may also be combined with either one or both of the internally disposed filter 52 and/or dispenser 40 as shown in FIGS. 4 and 5.

As seen in FIGS. 3 through 5, after receiving the dispenser 40 and/or filter 52 within the chamber 38, the second end 36 of the diffuser section 22 may be closed, such as by sealing the end 36. The diffuser section end 36 can be sealed, such as by heat sealing, ultrasonic welding, or can be sealed in another way, e.g. adhesively. If desired, the diffuser end 36 can be physically closed, such as with a tie, a closure, a clamp, or other component (not shown). If desired, the end 36 can also be sealed adhesively, bonded in another manner, crimped, or even deformed to close it.

The opposing end 34 of the diffuser section 22 will remain open and receive the end 30 of the connecting section 18. The connecting section 18 and diffusing section 22 are coupled together in a manner that keeps them together during recirculating pet fountain operation. The sections 18 and 22 can be disposed in telescopic engagement in a manner producing a tight friction fit therebetween that keeps them together during fountain operation but which allows them to be separated such as when it is desired to replace or refill dispenser 40 and/or replace the filter material 54. Where more permanent attachment is desired, the sections 18 and 22 can be thermally bonded together. If desired, the connecting section 18 and diffusing section 22 can also be bonded adhesively, ultrasonically welded, or secured in another manner as to join the two sections, 18, 22. In a preferred embodiment, the diameter of the connecting section 18 is less than the diameter of the diffuser section 22, as to allow the connecting section 18 to be received within the diffuser section 22 and block or prevent the dispenser 40 and/or filter media 54 from exiting the chamber 38 via the open end 34 of the elongated passage 44.

Referring now to FIG. 2, in use, water 16 discharged from the pump 11 through the diffuser 10 is diffused through the plurality of perforations 42 in the sidewall material 42 as the water 16 exits the diffuser section 22. This diffused water is exposed to an increase amount of oxygenated air as its surface area is increased while passing through the various perforations 42 and also while traveling down the exterior surface of the water diffuser 10, while flowing back into the pet fountain 14. This process of aeration advantageously increases the oxygen content within the recirculated water 16, as to prevent the formations of anoxic conditions within the volume of water 16. Such diffusion and aeration thereby limit the potential for undesirable anaerobic bacterial proliferation in the water 16, which may otherwise form in still or sitting water.

Referring now to FIGS. 8 and 9, a diffuser 10 constructed in accordance with the invention can have an elongate perforate tubular diffuser section 22 that can be formed, such as by being bent or having its shape memory changed, into an arc that extends from the discharge outlet 12 outwardly and even downwardly toward the basin 13 located below the cover 15 causing at least part of the diffuser 10, such as its perforate tubular diffuser section 22 to also function as a flow guide. If desired, the diffuser 10 can be formed and possess a length sufficient to guide the flow of water discharged from the outlet 12 through the diffuser 10 into water in the drinking well 17 of the basin 13. Surface tension and/or capillary action acting between the flowing water and diffuser 10 to slow the momentum and/or flow rate of the water the farther it travels along the diffuser 10 helping to reduce noise and splashing. Such a diffuser 10 can be shaped to extend outwardly of the discharge outlet 12 to at least overlie part of the open drinking well 17 such that the diffuser 10 not only functions as a flow guide that guides water being discharged from the pump 11 toward the basin 13 below but can also function as a splash-inhibitor that defines a splash guard the reduces and preferably prevents water discharged from the outlet 12 flowing through and out the diffuser 10 from splashing into water in the basin 13 below. In such an embodiment the diffuser 10 may include a connecting segment that is similarly bent or capable of having its shape memory changed. Alternatively, as shown in FIGS. 8 and 9, the diffuser 10 may include an elongate perforate tubular diffuser section 22 that is configured to be directly received within an outlet 12 of the pet fountain 14 that can be formed of or include a diffuser seat 25 that together with the elongate perforate tubular diffuser section 22 of the diffuser 10 defines a releasable diffuser coupling when engaged therewith. In such an embodiment, the diffuser seat 25 can be and preferably is configured to at least frictionally engage part of the braided material 46 that defines a sidewall 32 of a diffuser 10 that is telescopically inserted into the seat 25. As a result, a water-tight seal can be and preferably is produced between the tubular diffuser sidewall 32 and diffuser seat 25 with the diffuser seat 25 and the tubular diffuser section 18.

Still referring to FIGS. 8 and 9, a rod, wire or other elongated flow guide (not shown) can be employed that extends from the discharge outlet 12 in the cover 15 toward the drinking well 17 of the basin 13 to guide the flow of water discharged from the outlet 12 toward the well 17 along the rod, wire, or elongated flow guide via surface tension causing at least some and preferably more than 70% of the flowing water to cling thereto. Such a rod, wire or other elongated flow guide can be used in combination with a diffuser 10 constructed in accordance with the invention, including any of the above-discussed above diffuser embodiments. Such a rod, wire or other elongated flow guide can be used in combination with a diffuser 10 constructed in accordance with the invention, to maintain the diffuser 10 in a bent configuration shown in FIGS. 8 and 9. Such a flow-guide rod, wire or tube can extend from the outlet 12 through the diffuser 10, and may extend outwardly from the end 24 of the diffuser 10. If desired, such a flow guide rod, wire or tube can be attached or otherwise anchored to part of the diffuser 10 at a location away from the outlet 12 and can extend outwardly from end 24 of the diffuser 10. If desired, a plurality of such flow guiding rods, wires and/or tubes can be used that are spaced apart so flowing water clings to each rod, wire and/or tube separating water discharged out the outlet 12 into a plurality of spaced apart guided flows directed toward drinking well 17 of the pet fountain basin 13. Each such flow-guiding elongate wire, rod or tube can be deformable and can extend into the water including all the way to the bottom of the basin. Each flow-guiding elongate wire, rod or tube can be made of metal, plastic, or another material that can be deformed, such as by bending, in order to shape each such elongated water clinging flow guide such as to shape the path of flow of water into the basin clinging via surface tension to each elongated flow guide.

Understandably, the present invention has been described above in terms of one or more preferred embodiments and methods. It is recognized that various alternatives and modifications may be made to these embodiments and methods that are within the scope of the present invention. Various alternatives are contemplated as being within the scope of the present invention. It is also to be understood that, although the foregoing description and drawings describe and illustrate in detail one or more preferred embodiments of the present invention, to those skilled in the art to which the present invention relates, the present disclosure will suggest many modifications and constructions, as well as widely differing embodiments and applications without thereby departing from the spirit and scope of the invention.

It is claimed:

1. A pet fountain water diffuser in combination with a recirculating pet fountain comprising:
   a recirculating pet fountain comprised of a water-holding fountain basin, a fountain cover carried by the fountain basin and comprised of a water discharge outlet, a water pump in liquid-flow communication with the water discharge outlet for pumping water from the fountain basin to the water discharge outlet;
   a removable pet fountain water diffuser in telescopic registry with the water discharge outlet of the fountain cover, the pet fountain water diffuser comprised of an elongate tubular conduit having a shape memory and extending generally upwardly and outwardly from the fountain cover, the elongate tubular conduit comprising an elongate tubular perforate diffuser section having a perforate sidewall comprised of a mesh or woven material in which perforations are formed through which water can pass that are disposed along the perforate sidewall, wherein a distal end of the elongate tubular conduit is higher than a proximal end of the elongate tubular conduit; and
   wherein water from the basin is pumped by the water pump upwardly through the water discharge outlet into the perforate diffuser section, where the flow of water upwardly through the pet fountain water diffuser is diffused by passing through the perforations in the perforate sidewall of the perforate diffuser section before returning to the pet fountain.

2. The pet fountain water diffuser and recirculating pet fountain combination of claim 1, wherein the fountain water diffuser is shape-memory formable, enabling the fountain water diffuser to be bent to change the direction or orientation of the perforate diffuser section.

3. The pet fountain water diffuser and recirculating pet fountain combination of claim 2, wherein the perforate diffuser section comprises a flow guide that guides flow of water passing through the perforations in the perforate sidewall of the perforate diffuser section, such that the water flows along an exterior of the perforate sidewall generally downwardly back to the pet fountain.

4. The pet fountain water diffuser and recirculating pet fountain combination of claim 1, wherein the perforate sidewall is comprised of biaxially braided or woven filaments defining the perforate sidewall which is of flexible and endless construction and producing the perforate diffuser section which is of flexible construction.

5. The pet fountain water diffuser and recirculating pet fountain combination of claim 1, wherein the perforate diffuser section comprises a flow guide configured to guide flow of water passing through the perforations in the perforate sidewall of the perforate diffuser section generally downwardly along an exterior of the perforate sidewall and generally downwardly back into one of the fountain cover and the fountain basin of the pet fountain.

6. The pet fountain water diffuser and recirculating pet fountain combination of claim 1, wherein the perforate sidewall is formed of biaxially braided or woven plastic filaments defining the perforations in the perforate sidewall whose sizes change when the perforate diffuser section is subjected to stress or strain.

7. The pet fountain water diffuser and recirculating pet fountain combination of claim 1, wherein the pet fountain water diffuser further comprises an imperforate coupling tube that is removably telescopically inserted into the water discharge outlet of the fountain cover, and wherein the perforate diffuser section extends axially outwardly from the coupling tube.

8. The pet fountain water diffuser and recirculating pet water fountain combination of claim 1, further comprising a water treatment insert received in a chamber within the pet fountain water diffuser, the water treatment insert configured to treat water flowing upwardly through the pet fountain water diffuser contacting the water treatment insert and before the water passes through the perforations in the perforate diffuser section.

9. The pet fountain water diffuser and recirculating pet water fountain combination of claim 8, wherein the water treatment insert comprises a filter with a fibrous or chemical filter media configured to filter water flowing upwardly through the pet fountain water diffuser such that the water flows through the filter before the filtered water passes through the perforations in the perforate diffuser section.

10. The pet fountain water diffuser and recirculating pet water fountain combination of claim 8, wherein the water treatment insert comprises one of an animal medicament, an adjuvant, a supplement, and an attractant that is released into water flowing upwardly through the pet fountain water diffuser contacting the water treatment insert and which is contained in water passing through the perforations in the perforate diffuser section.

11. The pet fountain water diffuser and recirculating pet water fountain combination of claim 10, wherein the water treatment insert is further comprised of a water-soluble binder that dissolves in water flowing upwardly through the pet fountain water diffuser contacting the water-soluble binder, the water contacting the water-soluble binder causing the one of the animal medicament, adjuvant, supplement, and attractant to be released into water passing through the perforations in the perforate diffuser section.

12. The pet fountain water diffuser and recirculating pet water fountain combination of claim 8, wherein the water treatment insert comprises one of a catnip and a catnip oil that is released into water flowing upwardly through the pet fountain water diffuser and which is contained in water passing through the perforations in the perforate diffuser section.

13. The pet fountain water diffuser and recirculating pet water fountain combination of claim 12, wherein the water treatment insert is further comprised of a water-soluble binder that dissolves in water flowing through the pet fountain water diffuser, the water-soluble binder dissolved in the flowing water effecting release of the one of the catnip and catnip oil into water passing through the perforations in the perforate diffuser section, such that water passing through the perforations in the perforate diffuser section contains the one of the catnip and catnip oil.

14. The pet fountain water diffuser and recirculating pet water fountain combination of claim 8, wherein the water treatment insert is disposable, and the fountain water diffuser is configured to permit removal and replacement of the water treatment insert.

15. The pet fountain water diffuser and recirculating pet water fountain combination of claim 1, wherein the pet fountain water diffuser further comprises a coupling tube slidably telescopically received in the water discharge outlet of the fountain cover, and wherein the perforate diffuser section is removably attached to the coupling tube, enabling detachment of the perforate diffuser section from the coupling tube to access the water treatment insert.

16. The pet fountain water diffuser and recirculating pet water fountain combination of claim 15, wherein a free end of the perforate diffuser section disposed opposite the coupling tube is closed.

17. A pet fountain water diffuser in combination with a recirculating pet fountain, comprising:
a recirculating pet fountain comprised of a water-holding fountain basin, a fountain cover carried by the fountain basin and comprised of a water discharge outlet, a water pump in liquid-flow communication with the water discharge outlet for pumping water from the fountain basin to the water discharge outlet; and
a removable pet fountain water diffuser in telescopic registry with the water discharge outlet of the fountain cover, the pet fountain water diffuser comprised of:
(a) a coupling tube configured for telescopic insertion into the water discharge outlet of the fountain cover to mount the diffuser thereto,
(b) an elongated tubular conduit including a flexible elongate tubular perforate diffuser section of self-supporting construction that is configured to extend generally outwardly from the coupling tube, the perforate diffuser section having an endless flexible perforate sidewall comprised of a plastic mesh or woven material defining perforations in the perforate sidewall through which water being diffused passes, wherein a distal end of the elongate tubular conduit is higher than a proximal end of the elongate tubular conduit; and
(c) a flow guide defined by an outer surface of the perforate sidewall along which flow of water that has passed through the perforations in the perforate sidewall is guided generally downwardly by gravity; and
wherein the flexible elongate tubular perforate diffuser section is configured to extend outwardly from the fountain cover of the recirculating pet fountain when the coupling tube is telescopically received in the water discharge outlet of the fountain cover.

18. The pet fountain water diffuser and recirculating pet fountain combination of claim 17, wherein one of the coupling tube and the perforate diffuser section is shape-memory formable, enabling the direction or orientation of the perforate diffuser section to be changed.

19. The pet fountain water diffuser and recirculating pet fountain combination of claim 17, further comprising a water treatment insert removably received inside one of the coupling tube and the perforate diffuser section, the water treatment insert configured for treating water flowing through the pet fountain water diffuser by filtering the water before the water passes through perforations in the perforate sidewall of the perforate diffuser section.

20. The pet fountain water diffuser and recirculating pet fountain combination of claim 17, further comprising a water treatment insert received inside one of the coupling tube and the perforate diffuser section, the water treatment insert is a dissolvable solid block comprised of one of an animal medicament, an adjuvant, a supplement, and an attractant configured for treating water passing through the pet fountain water diffuser by the one of the animal medicament, adjuvant, supplement, and attractant being released from the dissolvable solid block into the water flowing through the pet fountain water diffuser before the water passes through perforations in the perforate sidewall of the perforate diffuser section.

21. The pet fountain water diffuser and recirculating pet fountain combination of claim 17, wherein the perforate sidewall is formed of biaxially braided or woven plastic filaments defining the perforations in the perforate sidewall whose sizes change when the perforate diffuser section is subjected to stress or strain.

22. The pet fountain water diffuser and recirculating pet fountain combination of claim 17, wherein the coupling tube is imperforate.

23. A pet fountain water diffuser in combination with a recirculating pet fountain, comprising:
a recirculating pet fountain comprised of a water-holding fountain basin, a fountain cover carried by the fountain basin and comprised of a water discharge outlet, a water pump in liquid-flow communication with the water discharge outlet for pumping water from the fountain basin to the water discharge outlet; and a removable pet fountain water diffuser in telescopic registry with the water discharge outlet of the fountain cover, the pet fountain water diffuser comprised of:

(a) a coupling tube configured for slidable telescopic insertion into the water discharge outlet of the fountain cover to mount the diffuser thereto orienting the pet fountain water diffuser so the pet fountain water fountain diffuser extends outwardly from the fountain cover;

(b) an elongated tubular conduit including a flexible tubular perforate diffuser section of self-supporting construction that extends outwardly from the coupling tube, the tubular perforate diffuser section formed of an endless flexible perforate sidewall made of a mesh or woven plastic material defining perforations in the perforate sidewall through which water being diffused passes, wherein a distal end of the elongate tubular conduit is higher than a proximal end of the elongate tubular conduit; and (c) a flow guide defined by an outer surface of the perforate sidewall along which flow of water that has passed through the perforations in the perforate sidewall is guided generally downwardly by gravity back to one of the fountain cover and fountain basin.

24. The pet fountain water diffuser and recirculating pet fountain combination of claim 23, wherein the perforate sidewall is comprised of biaxially braided or woven filaments defining the perforate sidewall which is of flexible and endless construction and producing the perforate diffuser section which is of flexible construction.

25. The pet fountain water diffuser and recirculating pet fountain combination of claim 23, further comprising a water treatment insert received inside one of the coupling tube and the perforate diffuser section, the water treatment insert is a dissolvable solid block comprised of one of an animal medicament, an adjuvant, a supplement, and an attractant configured for treating water passing through the pet fountain water diffuser by the one of the animal medicament, adjuvant, supplement, and attractant being released from the dissolvable solid block into the water flowing through the pet fountain water diffuser before the water passes through perforations in the perforate sidewall of the perforate diffuser section.

\* \* \* \* \*